(12) United States Patent
Huang et al.

(10) Patent No.: US 10,831,071 B2
(45) Date of Patent: Nov. 10, 2020

(54) COPPER-REDUCED GRAPHENE OXIDE CORE-SHELL TRANSPARENT CONDUCTOR FOR CONTROLLING LIGHT TRANSMISSION AND METHOD OF MAKING THE SAME

(71) Applicant: ZHEJIANG JINGYI NEW MATERIAL TECHNOLOGY CO., LTD, Zhejiang (CN)

(72) Inventors: Shengyun Huang, Longueuil (CA); Fuqiang Ren, Longueuil (CA); Dongling Ma, Pointe-claire (CA); Haining Zhu, Lasalle (CA); Shiyong Zhao, Longueuil (CA); Dawei Zhang, Lachine (CA); Shuyong Xiao, Sy-Laurent (CA)

(73) Assignee: ZHEJIANG JINGYI NEW MATERIAL TECHNOLOGY CO., LTD, Zhejiang (CN)

( * ) Notice: Subject to any disclaimer, the term of this patent is extended or adjusted under 35 U.S.C. 154(b) by 187 days.

(21) Appl. No.: 15/586,757

(22) Filed: May 4, 2017

(65) Prior Publication Data
US 2018/0321538 A1 Nov. 8, 2018

(51) Int. Cl.
*G02F 1/1343* (2006.01)
*G02F 1/167* (2019.01)
*G02F 1/17* (2019.01)
*G02F 1/1675* (2019.01)
*G02F 1/1676* (2019.01)

(52) U.S. Cl.
CPC .......... *G02F 1/13439* (2013.01); *G02F 1/167* (2013.01); *G02F 1/172* (2013.01); *G02F 1/1676* (2019.01); *G02F 2001/1678* (2013.01); *Y10T 428/10* (2015.01); *Y10T 428/1036* (2015.01)

(58) Field of Classification Search
CPC ................ G02F 1/13439; G02F 1/167; G02F 2001/1678; G02F 2001/1676; Y10T 428/10; Y10T 428/1036
See application file for complete search history.

(56) References Cited

U.S. PATENT DOCUMENTS

| | | | |
|---|---|---|---|
| 3,585,381 A | 6/1971 | Hodson | |
| 6,900,923 B2 | 5/2005 | Chakrapani | |
| 7,791,788 B2 | 9/2010 | Slovak | |
| 8,059,331 B2 | 11/2011 | Higashida | |
| 9,581,877 B2 | 2/2017 | Bass | |
| 2010/0047593 A1* | 2/2010 | Higashida | G02F 1/172 428/447 |
| 2014/0219906 A1* | 8/2014 | Kim | C01B 32/194 423/439 |
| 2015/0337458 A1* | 11/2015 | Duan | C30B 25/186 428/220 |

* cited by examiner

*Primary Examiner* — Anthony J Frost
(74) *Attorney, Agent, or Firm* — Yue (Robert) Xu; Apex Attorneys at Law, LLP (57) ABSTRACT

The invention provides an electrically conductive and optically transparent copper-reduced graphene oxide core-shell nanowires film and its specific application for light transmission controlling devices.

14 Claims, 6 Drawing Sheets

Figure 6

COPPER-REDUCED GRAPHENE OXIDE CORE-SHELL TRANSPARENT CONDUCTOR FOR CONTROLLING LIGHT TRANSMISSION AND METHOD OF MAKING THE SAME

TECHNICAL FIELD

The present invention is related to transparent conducting film, more specifically is directed to an electrically conductive and optically transparent copper-reduced graphene oxide core-shell nanowires film and its specific application for light transmission controlling devices.

BACKGROUND ART

Transparent Conducting Film (TCF) is a thin film, which optically allows photons to go through or transport (i.e, is transparent) and meanwhile electronically allows electrons to go through or transport (i.e., is conductive). Therefore it is technically characterized by two parameters, transparency and conductivity, and is essential in many optoelectronic devices, where both photons and electrons need to be transported, such as displays (liquid crystal display (LCD), light emitting diodes (LEDs) and organic LEDs (OLEDs)), photovoltaic devices, touch panels, and electrochromic windows. In these devices, TCF is served as an electrode and a layer or many layers of active opto-electronic components are sandwiched between two TCF electrodes, same or different kind, or between at least one TCF electrode and another non-transparent but electronically conducting electrode. The opto-electronic components are energetically excited by electrons or photons which are injected and extracted through the electrodes.

In some applications, electrons are injected into active components and the excited components transform the electronic energy to photons, such as LED and OLED devices, where light emits out thorough the transparent electrode. In some other applications, photons are injected to the active components through the transparent electrode and the excited components transform the photons into electric charges, which are collected by electrodes in devices, such as photovoltaic devices and photosensors. Still in some other applications, under an electromagnetic field created between the electrodes by applying electric voltages to them, the sandwiched active components may undergo chemical reaction such as redox in electrochromic devices as disclosed in U.S. Pat. No. 9,581,877, or transform crystal structure such as LCD as disclosed in U.S. Pat. No. 3,585,381A, or induce re-orientation such as in suspended particles devices (SPDs) as disclosed in U.S. Pat. No. 8,059,331 and US patent publication US20100047593. Depending on applications, other characters such as flexibility, stability and cost in addition to optical transmittance and electrical conductivity may be desired for TCF.

Although indium-tin-oxide (ITO) has been the industrial standard of transparent electrodes for a long time, several issues remain. ITO is relatively expensive and brittle, which is incompatible with flexible substrates. Moreover, there is a serious concern about the geographical availability of indium. Other TCF, including silver nanowires (Ag-NWs), silver nanoparticles, graphene, carbon nanotubes and conducting polymers (such as poly(3,4-ethylenedioxythiophene) polystyrene sulfonate (PEDOT:PSS)) and various metal mesh technologies (photolithography, direct printing, embossing, hybrid, and so on) have been intensively explored to replace ITO.

On the other hand, light transmission controlling devices, also called light valves(LV), such as smart windows in particular, are increasingly demanded by market to replace the traditional window shades or blinds for comfortable living and energy saving. Currently, three main technologies are explored in these devices, referred as LCD, electrochromic device (ECD) and SPD. All these three technologies need transparent electrodes in both sides of the device, and the cost of transparent electrodes is becoming an economical road block for large area application.

In particular, a SPD device such as those described in U.S. Pat. No. 8,059,331 and US patent publication US20100047593, where electrodes of both sides are used to create an electromagnetic field, and electric current does not need to flow through from one electrode to the other, prefers to have TCF with high optical transparency but unnecessary high electric conductivity. Therefore, a potential economic TCF with relatively lower electric conductivity such as copper-reduced graphene oxide (Cu-rGO) core-shell nanowires (Hereinafter, copper-reduced graphene oxide (Cu-rGO) core-shell nanowires are abbreviated as Cu-rGO-csNW.) film to be disclosed in this patent application is practically applicable for SPD application. As further disclosed in the patent application, the light transmittance of Cu-rGO-csNW film can be very high up to 95%, with square resistance at about 1000 Ω/sq, which is potentially economic and preferable for SPD devices.

It is now the objective of the present invention to provide an electrically conductive and optically transparent Cu-rGO-csNW film and the method to make such a film.

It is now also the objective of the present invention to provide a method to assemble a light transmission controlling device using the electrically conductive and optically transparent Cu-rGO-csNW film provided in this invention.

SUMMARY OF THE INVENTION

The present invention provides an electrically conductive and optically transparent Cu-rGO-csNW film and the method to make such a film.

The present invention also provides a method to assemble a light transmission controlling device using the electrically conductive and optically transparent Cu-rGO-csNW film provided in this invention.

DETAILED DESCRIPTION OF THE INVENTION

The present invention provides an electrically conductive and optically transparent Cu-rGO-csNW films and the method to make such a film. It also provides a method to assemble light transmission controlling devices using the electrically conductive and optically transparent Cu-rGO-csNW film provide in this invention. The developed TCF electrode not only presents attractive features in SPD, but also holds high promise for applications in solar cells, LED, touch panels and flat displays. In this invention, the developed TCF for particular light controlling device, more specifically SPD has been disclosed.

Figure 1:
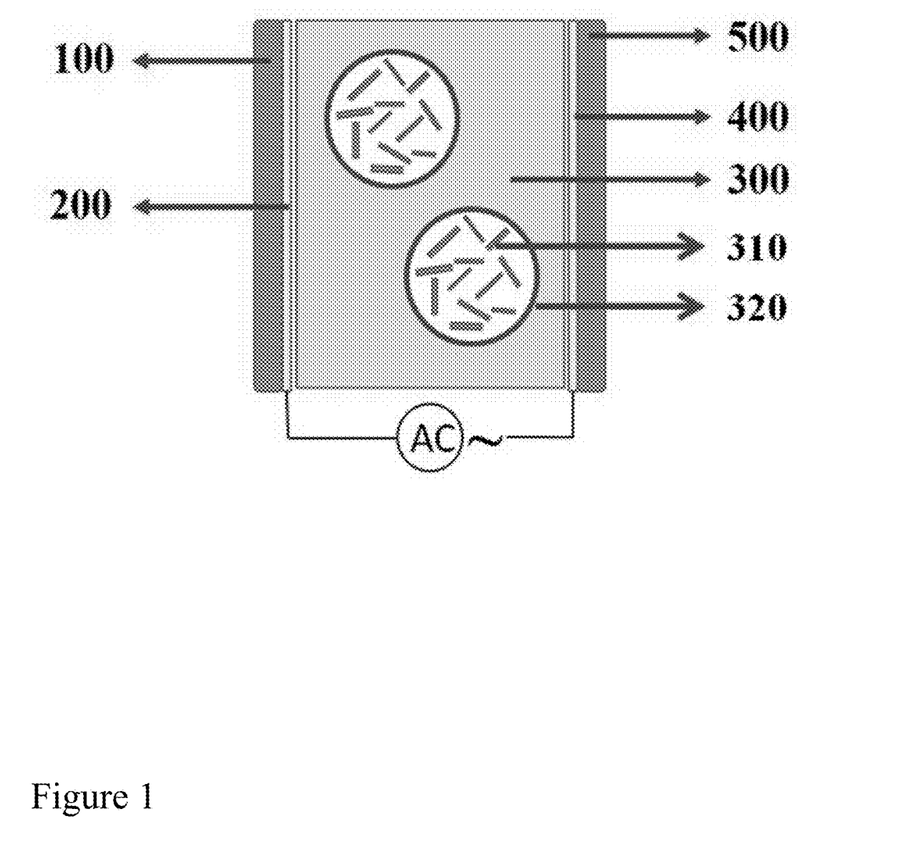
FIG. 1 presents schematically the light controlling device, wherein, 100 is a transparent substrate, 200 is layer of Cu-rGO-csNW film, 300 is layer of polymeric matrix containing suspended particles (310) in droplets (320), 400 is another layer of Cu-rGO-csNW film, and 500 is another transparent substrate.

FIG. 1 schematically illustrates a light controlling device, specifically a SPD, wherein, 100 is a transparent substrate, 200 is layer of Cu-rGO-csNW film developed in this invention, 300 is layer of polymeric matrix containing suspended particle (310) in droplets (320), 400 is another layer of Cu-rGO-csNW film developed in this invention, and 500 is another transparent substrate.

According to this invention as illustrated in FIG. 1, the said transparent substrate 100 and the said transparent substrate 500 can be made of the same material or different materials, where light can be transmitted through, preferably having a light transmittance equals to or greater than 80%, more preferably 90%. Either the said transparent substrate 100 or the said transparent substrate 500 can be glass or plastic including but not limited to polyethylene terephthalate (PET), polyethylene (PE), polyethylene naphthalate (PEN), polymethyl methacrylate (PMMA) and polycarbonate (PC). Even though there is no restriction in choosing the said transparent substrates 100 and 500, they are preferred to be of the same material for the simplicity of processing and for the physical flexibility of the final device.

According to this invention as illustrated in FIG. 1, both the Cu-rGO-csNW film 200 and Cu-rGO-csNW film 400 are preferably to be the same in order to have similar optical effect at the both sides of the polymeric matrix layer which contains suspended particles (310) in droplets (320), so the light can be controlled in a symmetric manner, eventually help to reduce the haze effect of the device.

In this invention, the copper-graphene oxide (Cu-GO) core-shell nanowires (Hereinafter, copper-graphene oxide (Cu-GO) core-shell nanowires are abbreviated as Cu-GO-csNW) were first prepared and then subjected to chemical reduction to yield Cu-rGO-csNW. According to this invention, Cu-GO-csNW formation was first achieved by mixing graphene oxide (GO) aqueous solution with copper nanowires (Cu—NW) in iso-propanol (IPA) suspension. The ratio of Cu—NW diameter to GO thickness was adjusted and optimized for balancing the optical and electrical properties of core-shell hybrid NW and films by manipulating surface chemistry and ligands and by varying concentrations of both Cu—NW in IPA and GO in water as well. The above variables were systematically screened and, hence a suitable GO thickness for Cu-NWs of certain diameter was finally identified. According to this invention, the Cu-GO-csNW films can be obtained by transfer printing, spin coating, blade coating and droplet coating, and other film formation techniques. Also, by varying either the volume or concentration of Cu-GO-csNW in solution, the films with varied thicknesses and different transparencies can be obtained. In this invention, a membrane transferring technique is further disclosed, where the Cu-GO-csNW is deposited by vacuum filtration on a filter membrane, followed by pressure-aided NW film transfer to the selected transparent substrate.

In this invention, either a one-step or a two-step reduction protocol can be used to prepare Cu-rGO-csNW films from Cu-GO-csNW films. In the two-step reduction protocol, the reduction of Cu-GO-csNW was firstly performed by exposing the films to reducing environments, such as hydrazine vapor, dipping them in sodium borohydride or ascorbic acid solutions. Subsequently, in the second step, the partially reduced films were further thermally annealed under reducing atmosphere, such as Argon:Hydrogen ($Ar:H_2$) or Nitrogen:Hydrogen ($N_2:H_2$) at a temperature from 200 to 400° C. In the one-step reduction protocol, the Cu-GO-csNW films were only reduced by thermal annealing under reducing atmosphere. The thermal annealing step enhances the degree of reduction of the films, and more importantly, it sinters the NWs together to create intimate contact junctions. Considering the ultra-small diameters and consequently largely reduced melting points, overheating will easily break the NWs. Under-heating, however, does not provide enough thermal energy to weld the NWs together and to reduce the GO. Therefore, the annealing temperature requires careful optimization and prefers to be in the range of 200 to 400° C., and mostly prefers to be in the range of 240 to 300° C.

According to this invention as illustrated in FIG. 1, the said polymeric matrix layer 300 is preferably a high light transmittance plastic material. More preferably, the said polymeric matrix 300 can be formed by photo-curing, so the shrinkage of this layer can be technically controlled. Still more preferably, the said polymeric matrix layer 300 is a cross-linked polysiloxane formed from liquid siloxane copolymer with ethylenically unsaturated bond by photo-curing method described in U.S. Pat. Nos. 6,900,923 and 7,791,788. Hereinafter, the photo-curable polysiloxane which is used to form the polymeric matrix layer 300 is referred as the polymeric matrix material (PM). The optical transmittance is related to the thickness of the layer 300, and such a thickness is preferably between 20-200 μm, more preferably, 50-120 μm.

According to this invention as illustrated in FIG. 1, the said polymeric matrix layer 300 embeds many droplets (320) and each droplet (320) encapsulates multiple particles (310), and these particles (310) are capable of re-orientation in an electronic field. Hereinafter, the droplet material (320) is also referred as the suspension media (SM) and the particle is also referred as light polarized particle (LPP) for scientific proposal.

As illustrated in FIG. 1, the SM, ie, the material to form droplet (320) shall be different from the PM material, and shall keep in a liquid form or at least a gel form within the PM. If the PM is an acrylate, the said SM is preferably selected from silicone oil or TDTM(Tri-Isodecyl trimellitate), or a mixture of any two and more materials as listed in U.S. Pat. Nos. 6,900,923 and 7,791,788.

As illustrated in FIG. 1, the said LPPs (320) which are encapsulated inside the said droplet (310) shall be capable of re-orientating themselves in an electronic field. Not only shall the chemical nature of the LPP but also the geometric dimension of the LPP be scientifically optimized. In terms of geometric dimension, the optimized LPP is preferably having a length of about 100-500 nm, more preferably 150-300 nm, and a diameter of 20-100 nm, more preferably 30-60 nm. The chemical composition of the said LPP is preferably selected from titanium dioxide ($TiO_2$), polyhalides and herapathite. More preferably, LPP is composed of calcium polyhalide, as listed in U.S. Pat. No. 8,520,294.

Practically according to this invention, the said PM (300) material, the said SM (320) material and the said LPP (310) are formulated into an emulsion, hereinafter referred as SPD emulsion. The film formed from this SPD emulsion can be sandwiched between two Cu-rGO-csNW layer 200 and 400. Other additives including stabilizer and/or emulsifier can also be added into this formulated SPD emulsion.

In one embodiment, the layer 100 and the layer 500 are glass material. The Cu-rGO-csNW film 200 and the Cu-rGO-csNW film 400 were first formed onto glass substrate 100 and 500 to have two identical TCF films, 200/100 and 400/500. Adhesive spacers were used to define the thickness and device geometry on one TCF film. The formulated SPD emulsion was then filled into the space defined by the spacers, and subsequently covered by another TCF film. Such an assembly was then exposed to UV-radiation to cure the emulsion and form the layer 300 between the layer 200 and the layer 400, ultimately a light controlling device as illustrated in FIG. 1 is completed.

In another embodiment, the layer 100 and the layer 500 are PET film. The Cu-rGO-csNW film 200 and the Cu-rGO-csNW film 400 were first formed onto the PET film 100 and 500 to have two identical TCF films, 200/100 and 400/500. The formulated SPD emulsion was first applied onto one TCF film 200/100 by doctor blade method to achieve a thickness of about 100 μm, then was exposed to UV-radiation to cure the emulsion and form the layer 300 on top of the film of 200/100; finally another TCF film 400/100 was placed on the top of the layer 300 to complete the assembly of a light controlling device as illustrated in FIG. 1.

EXAMPLES

The invention will now be described in more detail with reference to the following examples. However, it should be understood that these examples are given for the purpose of illustration only and are not intended to limit the scope of the present invention.

Example 1

Figure 2:
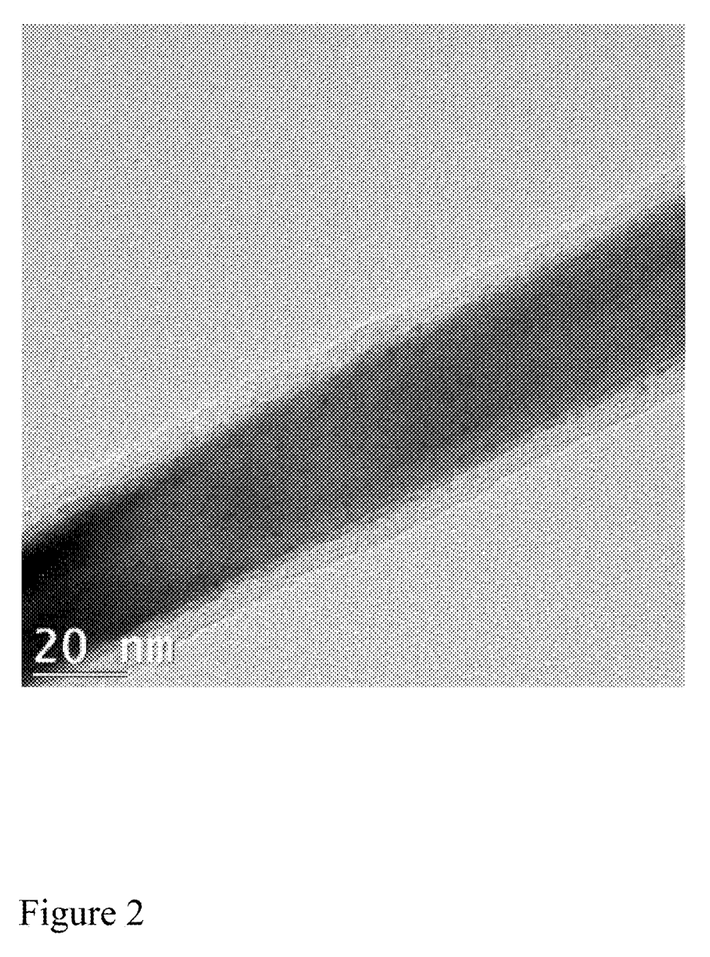
FIG. 2 presents a TEM image of the invented Cu-rGO-csNW nano-structure.

In this example, Cu-GO-csNW nano-structure was prepared by mixing GO aqueous solution (0.5 mg/ml, 2 ml) with Cu—NW in IPA (1 mg/ml, 5 ml) suspension. The mixture was then washed by centrifugation (8000 rmp, 5 min) several times to remove residual GO. The ratio of Cu—NW diameter to GO thickness can be adjusted and optimized for balancing the optical and electrical of core-shell hybrid NW and films. The morphologies of the synthesized core-shell NWs were examined using a transmission electron microscope (TEM), as shown in FIG. 2. The average length and diameter of synthesized Cu—NW cores are around 40±10 μm and 20±5 nm respectively, and the GO shell is around 5 nm in thickness.

Example 2

Figure 3:
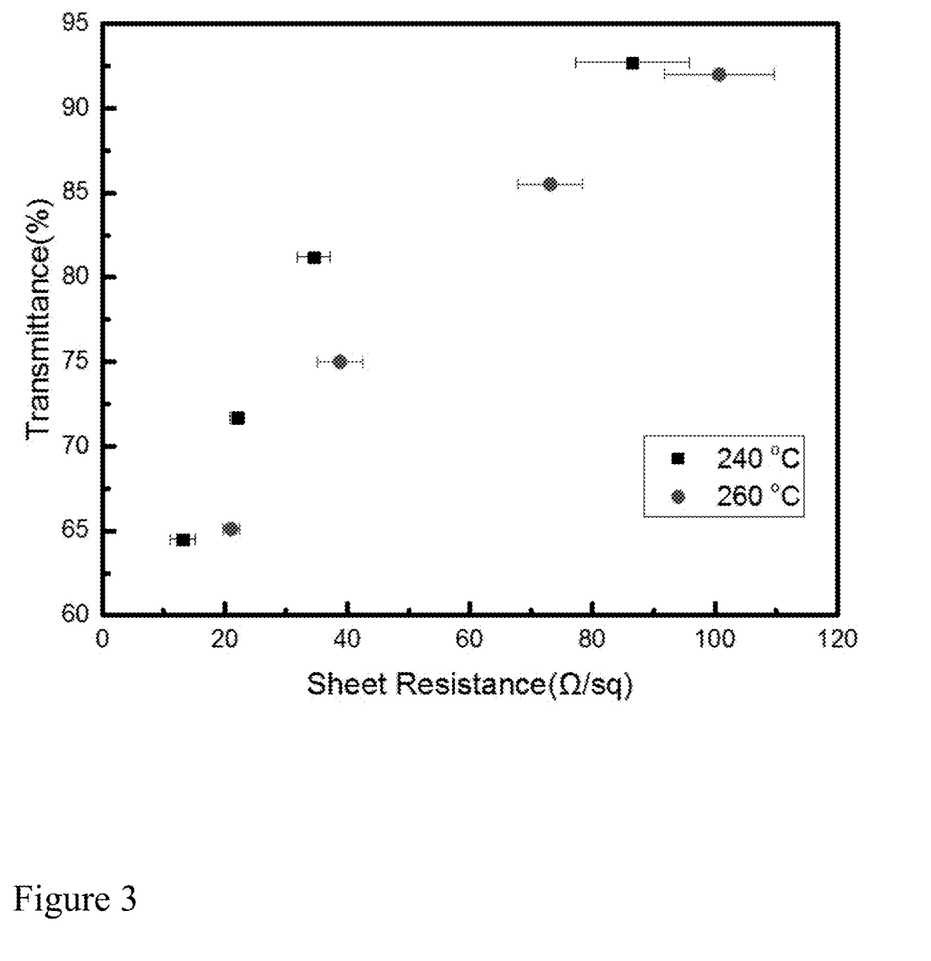
FIG. 3 presents transmittance and sheet resistance of Cu-rGO-csNW film prepared at different reduction temperature exampled in this invention.

In this example, the Cu-GO-csNW films were obtained by vacuum filtration of the csNW nano-structure dispersion as described in Example 1 using polytetrafluoroethylene porous filter membrane. The deposited films were subsequently transferred to a glass slide with csNW in contact with the glass by applying uniform pressure (3 kg weight) to the backside of the membrane. The membrane was peeled off to leave csNW network on the target substrate after 6 hours. For the thermal reduction, the as-prepared Cu-GO-csNW film was then exposed to a mixed atmosphere containing 95% vol./vol. argon (Ar) and 5% vol./vol. of hydrogen ($H_2$) at a temperature of 240° C. for 2 hours. The thermal annealing can not only enhance the degree of reduction of the films, but also more importantly, it can sinter the NWs together to create intimate contact junctions. After the reduction, the Cu-GO-csNW film was transformed to the designed Cu-rGO-csNW film. The transmittance and electronic conductivity of Cu-rGO-csNW film were measured by an UV-vis-NIR spectrophotometer and a four-point probe, respectively. As shown in FIG. 3, when the temperature of thermal annealing was 240° C., a Cu-rGO-csNW film with a transmittance of 92.7% and a sheet resistance of 86.5 Ω/sq was obtained.

Example 3

Figure 4:
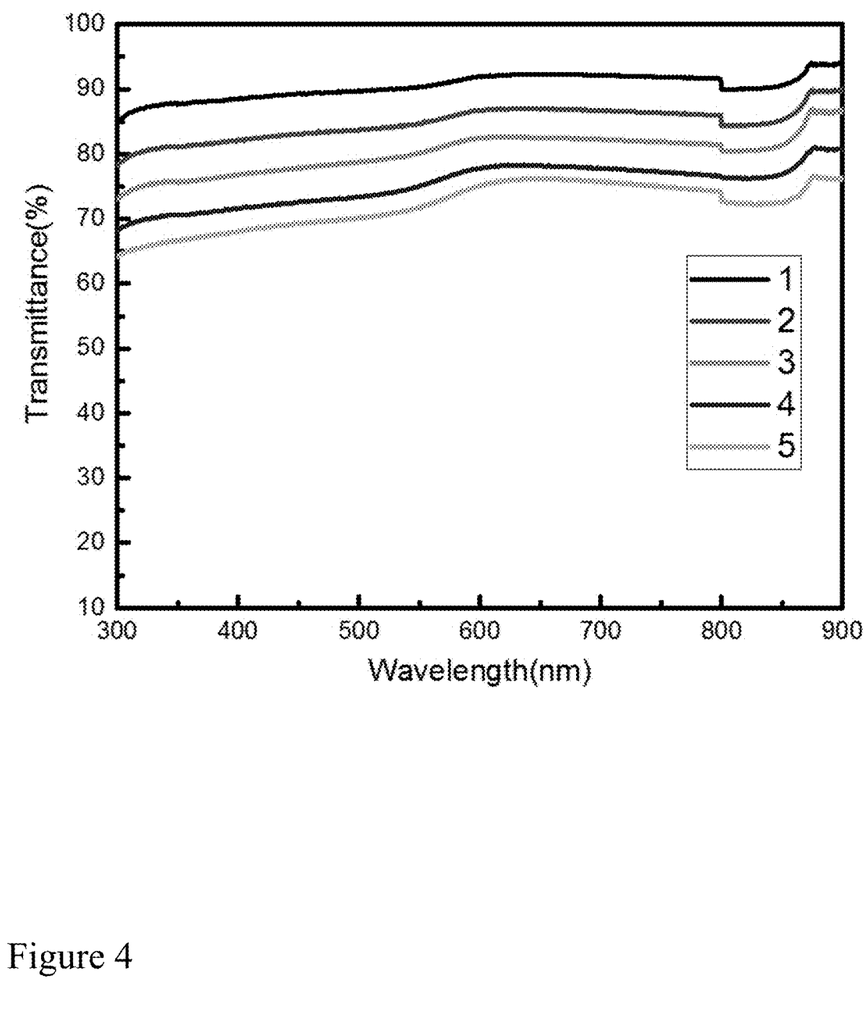
FIG. 4 presents optical transmittance of Cu-rGO-csNW film with different thickness exampled in this invention.

Following the procedures described in Example 1 and Example 2, Cu-rGO-csNW films with different thickness were obtained by varying the loading amount during vacuum filtration. With the increase of thickness, the transmittance at 550 nm of the films was gradually lowered from 92.7% to 72.5%, as show in FIG. 4.

Example 4

In this example, a SPD device of 2 cm×2 cm was assembled using the adhesive spacer method with a thickness of 100 μm according to the typical procedure disclosed above, where the transparent substrate 100, the Cu-rGO-csNW film 200, the polymeric matrix layer 300, the Cu-rGO-csNW film 400, and the transparent substrate layer 500 used are respectively glass, Cu-rGO-csNW film (transmittance 90% and sheet resistance 70 Ω/sq, prepared in Example 3), PMMA containing suspended polyhalide-type LPP particles, Cu-rGO-csNW film (transmittance 90% and sheet resistance 70 Ω/sq, prepared in Example 3) and glass.

Figure 5:
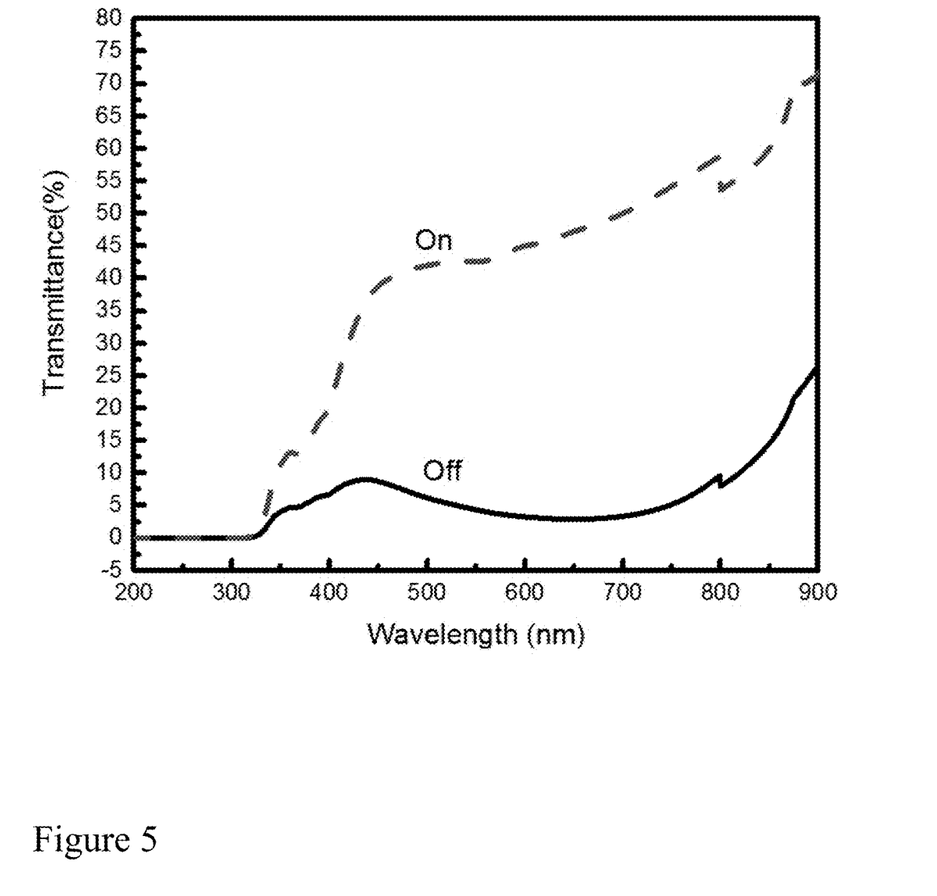
FIG. 5 presents transmission spectra of the light controlling device exampled in this invention before (off state) and after (on state) the application of an electric voltage of 110V.
Figure 6:
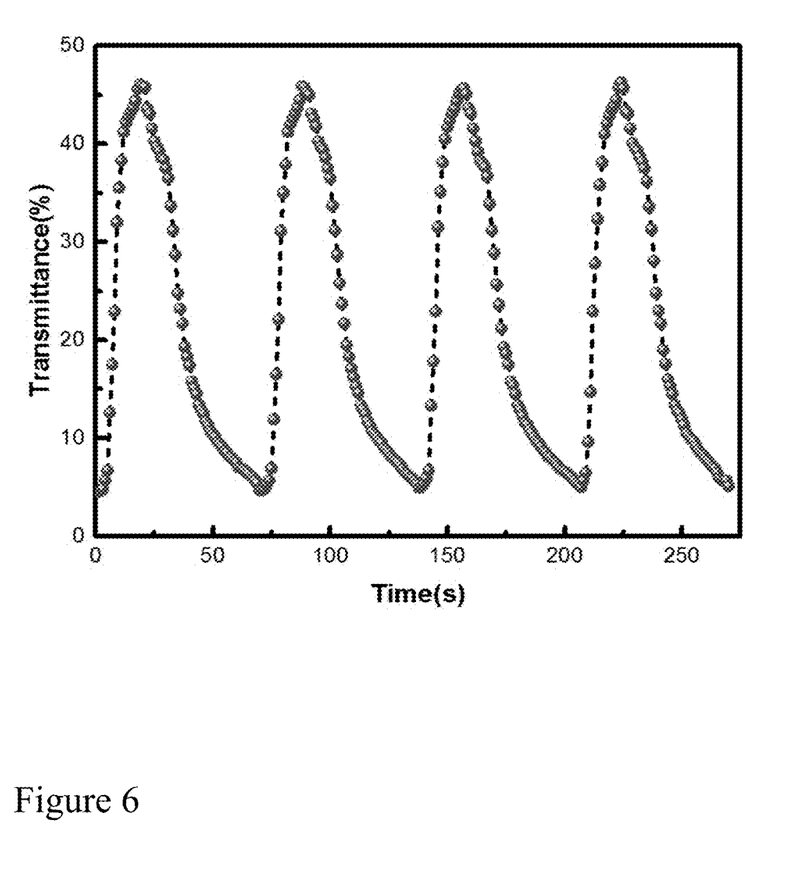
FIG. 6 presents light transmittance of the light controlling device exampled in this invention going cycles of on-off electric voltage.

FIG. 5 presents the transmission spectra of the light controlling device prepared in Example 4 before (off state) and after (on state) an electric voltage of 110V is applied. The maximum optical modulation of the device is 49.6% at the wavelength around 756 nm, which is actually high enough considering practical applications. FIG. 6 shows that the device is reversibly switched between high and low transmittance. The estimated on and off switching time is 20 s and 40 s, respectively, and such a performance then was tested for over a hundred cycles without notable changes. It implies good reversibility of the on/off switching processes of the assembled SPD device.

Example 5

The same conditions were used as Example 4, but the transmittance of the Cu-rGO-csNW film was reduced to 80%. The maximum optical modulation of the device was reduced to around 39.1%.

REFERENCE CITED

U.S. Patent Documents

U.S. Pat. No. 9,581,877, John David Bass et al. 2016
U.S. Pat. No. 3,585,381A, Theodore L Hodson et al. 1971
U.S. Pat. No. 8,059,331, Osamu Higashida et al. 2010
US20100047593, Osamu Higashida et al. 2010
U.S. Pat. No. 6,900,923, Srinivasan Chakrapani et al. 2005
U.S. Pat. No. 7,791,788, Steven M. Slovak et al. 2010

What is claimed is:
1. A light transmission controlling device, comprising of:
a first layer of a transparent substrate;

a first layer of copper-reduced graphene oxide core-shell nanowires (Cu-rGO-csNW) film residing on top of said first layer of said transparent substrate;

a layer of polymeric matrix containing suspended particles on the top of said first layer of Cu-rGO-csNW film;

a second layer of Cu-rGO-csNW film residing on said layer of polymeric matrix;

a second layer of transparent substrate on said layer of second layer of Cu-rGO-csNW film, wherein said first layer of Cu-rGO-csNW film and said second layer of Cu-rGO-csNW film are formed from a copper-graphene oxide core-shell nanowires (Cu-GO-csNW) film.

2. The light transmission controlling device as recited in claim 1, wherein said first layer of transparent substrate is a glass sheet.

3. The light transmission controlling device as recited in claim 1, wherein said first layer of transparent substrate is PET film.

4. The light transmission controlling device as recited in claim 1, wherein said second layer of transparent substrate is a glass sheet.

5. The light, transmission controlling device as recited in claim 1, wherein said second layer of transparent substrate is PET film.

6. The light transmission controlling device as recited in claim 1, wherein said first layer of Cu-rGO-csNW film has a transmittance from 75%-95%.

7. The light transmission controlling device as recited in claim 1, wherein said second layer of Cu-rGO-csNW film has a transmittance from 75%-95%.

8. The light transmission controlling device as recited in claim 1, wherein said first layer of Cu-rGO-csNW film has a square resistance from 10 to 1000 ohm.

9. The light transmission controlling device as recited in claim 1, wherein said second layer of Cu-rGO-csNW film has a square resistance from 10 to 1000 ohm.

10. The light transmission controlling device as recited in claim 1, wherein said first layer of Cu-rGO-csNW film has a thickness of 50 nm to 250 nm.

11. The light transmission controlling device as recited in claim 1, wherein said second layer of Cu-rGO-csNw film has a thickness of 50 nm to 250 nm.

12. The light transmission controlling device as recited in claim 1, wherein said layer of polymeric matrix has a thickness between 20 µm and 200 µm.

13. The light transmission controlling device as recited in claim 1, wherein said layer of polymeric matrix is a cross-linked polysiloxane.

14. The light transmission controlling device as recited in claim 1, wherein said suspended particles contained inside said layer of polymeric matrix are polyhalides.

* * * * *